Figure 1:
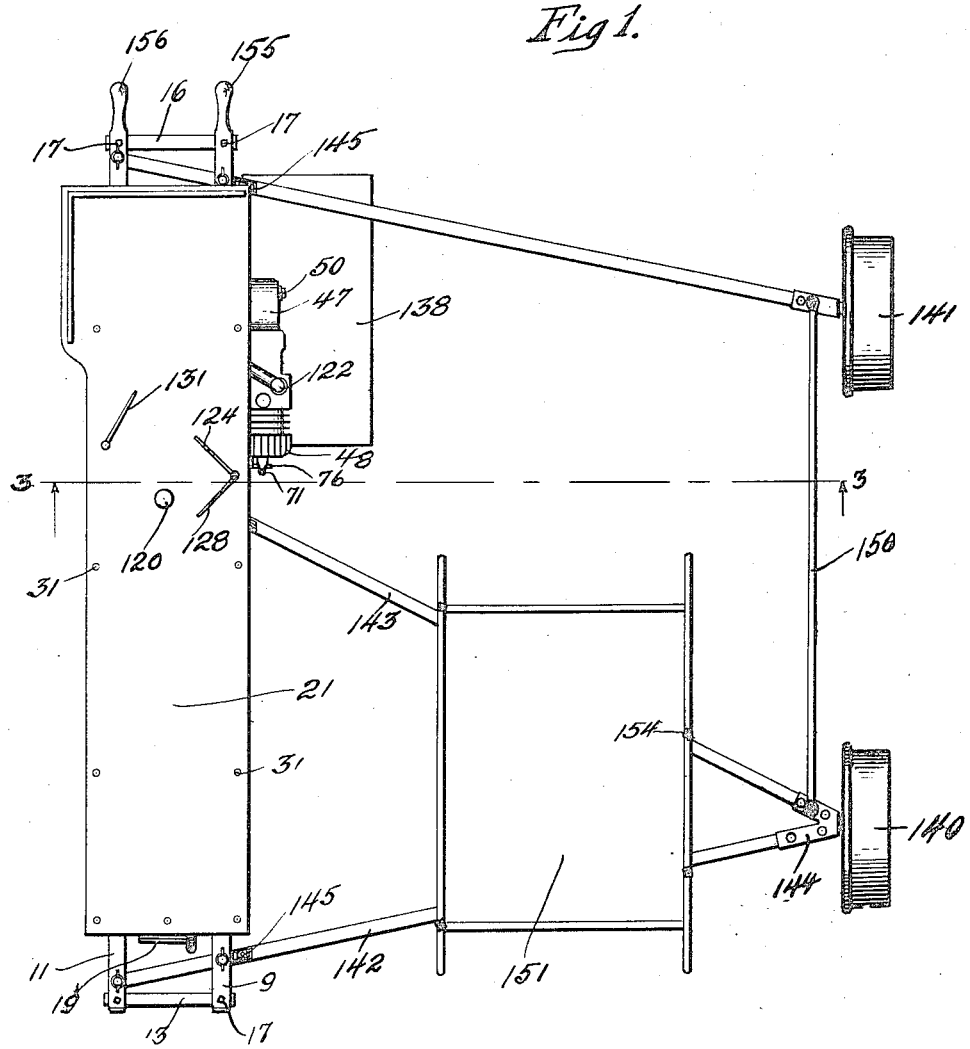

W. E. ADAMS.
MOTOR CAR.
APPLICATION FILED JULY 30, 1910.

993,939.

Patented May 30, 1911.
4 SHEETS—SHEET 1.

Witnesses:
Ephraim Banning
Wm P Bond

Inventor:
Warrington E. Adams.
By Banning & Banning
Attorneys.

W. E. ADAMS.
MOTOR CAR.
APPLICATION FILED JULY 30, 1910.
993,939.
Patented May 30, 1911.
4 SHEETS—SHEET 2.
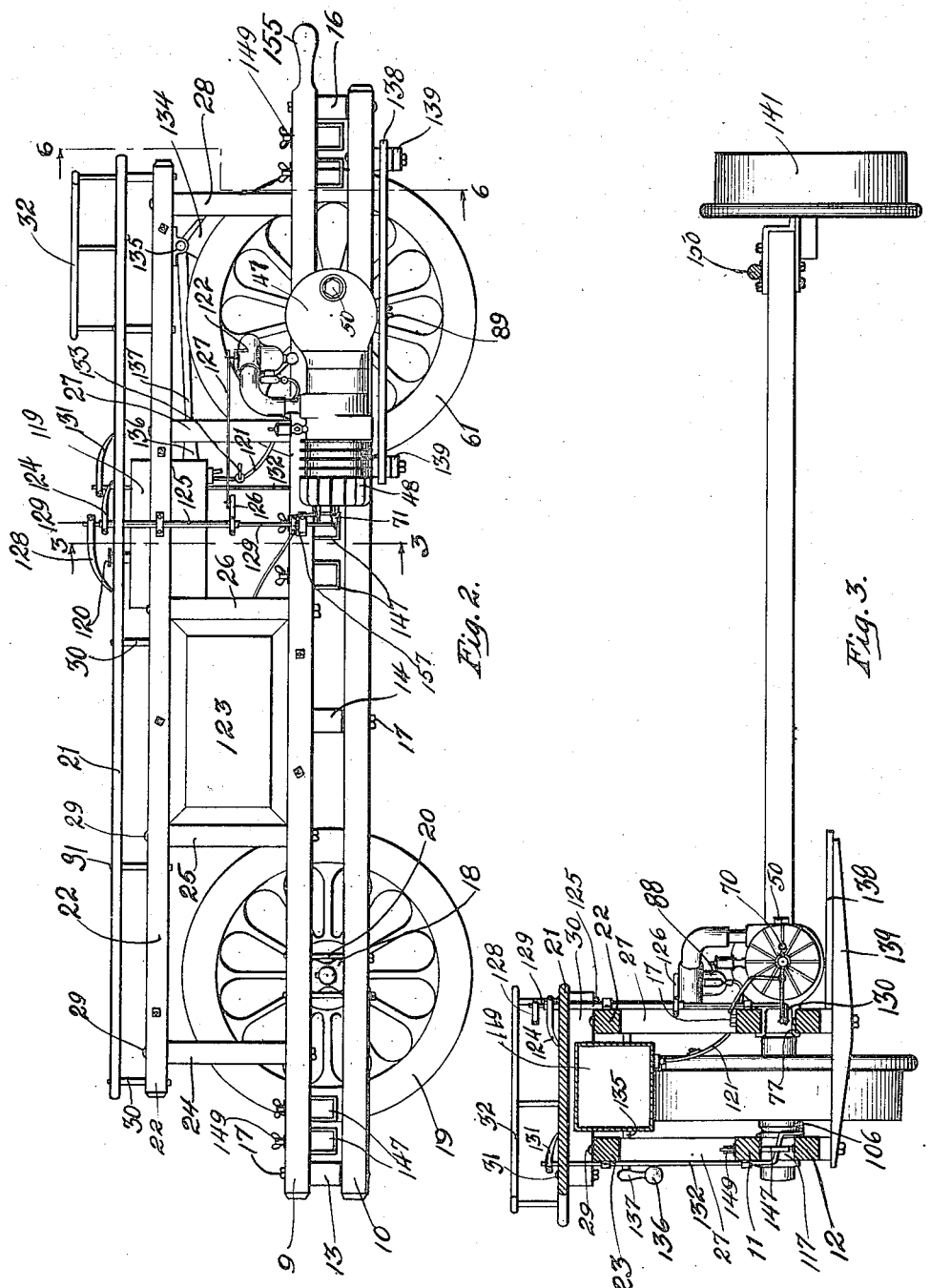
Witnesses:
Ephraim Banning
Inventor:
Warrington E. Adams.
By Banning & Banning
Attorneys.

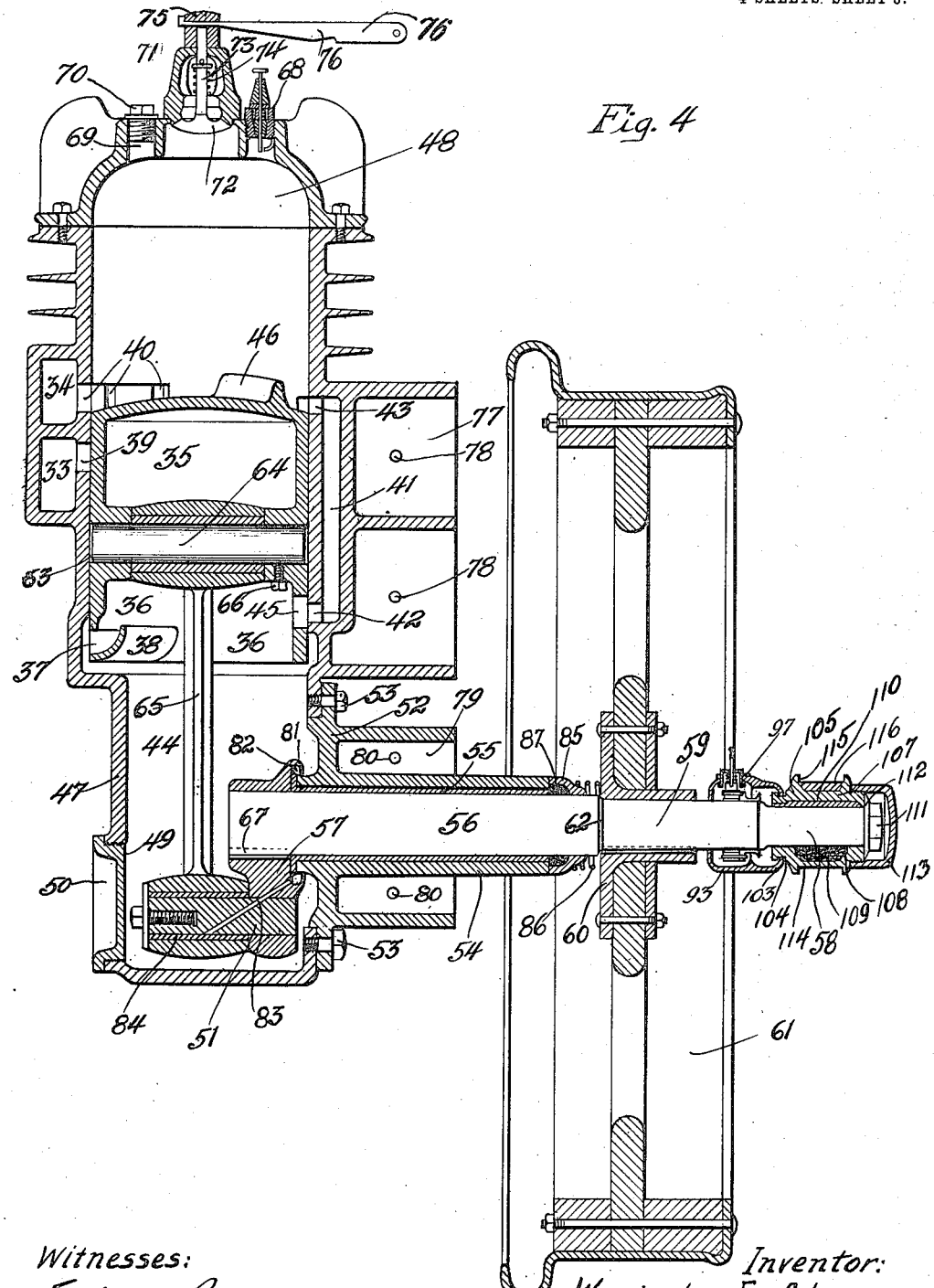

W. E. ADAMS.
MOTOR CAR.
APPLICATION FILED JULY 30, 1910.
993,939.
Patented May 30, 1911.
4 SHEETS—SHEET 4.
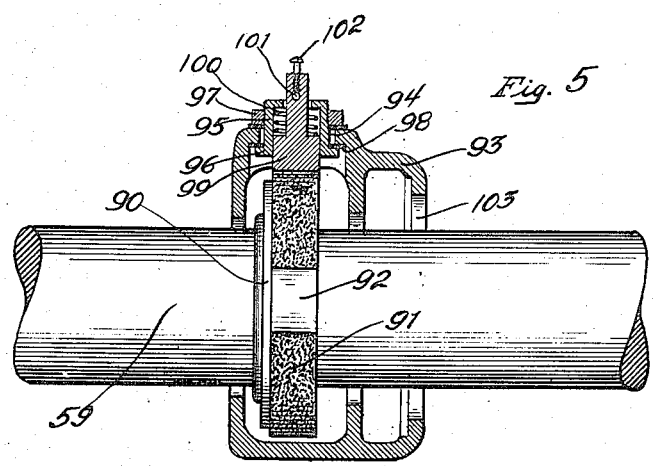
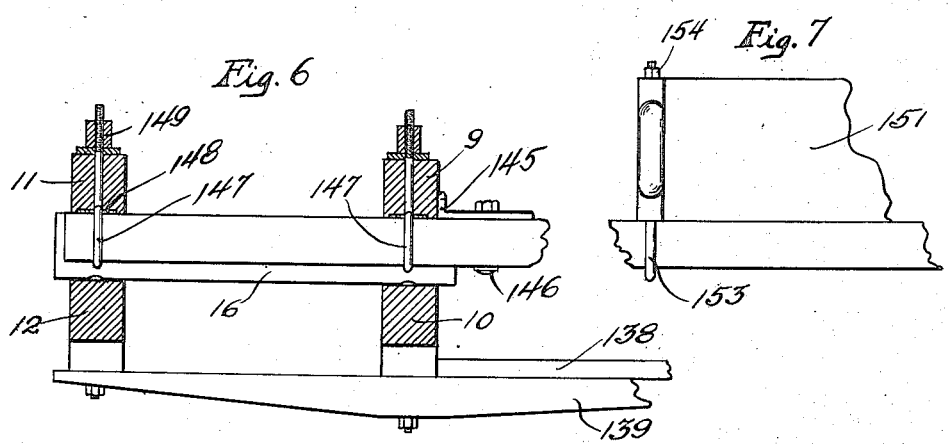
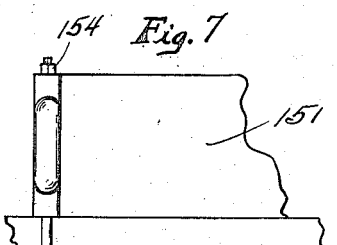
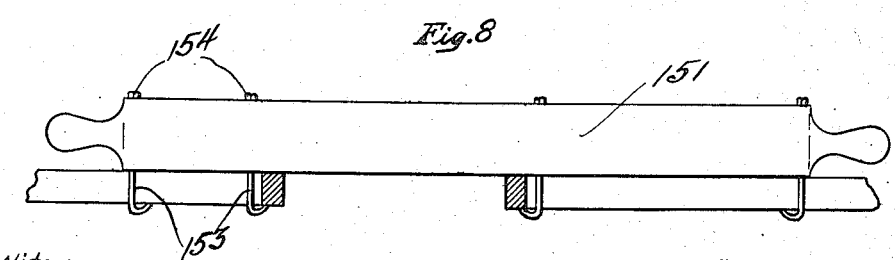
Witnesses:
Inventor:
Warrington E. Adams.
BY
Attorneys.

UNITED STATES PATENT OFFICE.

WARRINGTON E. ADAMS, OF CHICAGO, ILLINOIS.

MOTOR-CAR.

993,939.  Specification of Letters Patent.  Patented May 30, 1911.

Application filed July 30, 1910. Serial No. 574,677.

*To all whom it may concern:*

Be it known that I, WARRINGTON EARL ADAMS, a citizen of the United States, residing at Chicago, in the county of Cook and State of Illinois, have invented certain new and useful Improvements in Motor-Cars, of which the following is a specification.

This invention relates to a new and improved type of motor car adapted for use on railways where a demand exists for a light, strong and durable motor car capable of obtaining high speeds, being at the same time constantly under the complete control of the operator and intended in general to fill the requirements which come upon such cars.

Objects of the invention are, to provide a car of simple and cheap construction; to provide one having few parts but so designed and assembled as to secure the maximum amount of stiffness and rigidity; to provide one of such lightness that it can be quickly removed from the track in times of emergency; to provide a car in which the various controlling levers and valves are all arranged and assembled in such a way that the operator can reach each and every one of them without difficulty and without confusion; to provide a car capable of high speeds; to provide one which is so balanced that when operated at high speeds the vibration and consequent danger will be reduced to a minimum; to provide a car which can be easily assembled and disassembled for purposes of shipment or repair; to facilitate the attaching and removing of the third and fourth wheels of the car; to enable the use of trays of different sizes on the same framework, and in other ways and manners to improve the construction of such cars and to provide a car which shall be thoroughly satisfactory and in every way adapted to the service and requirements which it is intended to fulfil.

Other objects and uses will appear from a detailed description of the invention, which consists in the features of construction and combination of parts hereinafter described and claimed.

In the drawings—Figure 1 shows a plan view of the car having both the third and fourth wheels attached and a tray in position; Fig. 2 is a side elevation of the main portion of the car, the third and fourth wheels being removed; Fig. 3 is a cross section of the car taken on the line 3—3 of Fig. 1, looking in the direction of the arrows; Fig. 4 is a detail plan section of the engine showing the piston at the extreme end of the working stroke; the outriding bearing being rotated 90 deg. from normal working position. Fig. 5 is a detail cross section of the preferred form of commutator for the engine; Fig. 6 is a detail cross section of the frame-work taken on the line 6—6 of Fig. 2, looking in the direction of the arrows; Fig. 7 is a detail end elevation of one corner of the tray, showing the manner in which the same is attached to the cross rails; and Fig. 8 is a detail side elevation of the tray showing the preferred manner of attaching the same to the cross rails.

Referring to the drawings, the main portion of the car, which I will hereafter term the body portion, is best illustrated in Figs. 2 and 3. This body portion comprises four longitudinal rails, 9, 10, 11 and 12, placed two together vertically, and the two pairs thus formed being located in a horizontal plane with respect to each other. These four rails are rigidly held together by means of cross braces 13, 14, 15 and 16 (15 not being shown), bolts or studs, such as 17, passing vertically through each pair of rails 9, 10 or 11, 12, and through the end portion of the cross braces. If preferred, the cross braces and rails may be dove-tailed or countersunk together, preferably by counter-sinking the rails into the cross pieces, in order to further stiffen the construction. The pairs of rails 9, 10 and 11, 12 are spaced apart just sufficiently to receive between them journal boxes such as 18, of the forward wheel 19, and the rails may be securely clamped against these journal boxes by means of bolts or studs 20, best shown in Fig. 2. The spaces between the pairs of rails 9, 10 and 11, 12 are also sufficient to receive flanges on the casing of the engine, so that the latter may be rigidly held in place in a manner which will be presently described.

The platform 21 of the body portion is carried in the following manner: Two longitudinal rails 22 and 23 are solidly attached to the rails 9 and 11 by means of a plurality of struts 24, 25, 26, 27 and 28, bolts, as 29, being passed through the rails 22 or 23, struts, and rails 9 or 11. A plurality of cross braces 30 are laid on the rails 22 and 23, the platform 21 being laid on these cross braces, and the platform, cross braces and the rails being firmly held together as by means of bolts 31. It is seen that this construction of frame-work is extremely simple but stiff and rigid, and that it is well adapted to carrying the loads and strains which will come upon it in service. When preferred, a back railing 32 may be provided at the rear end of the platform, of a height and shape to provide a comfortable and efficient seat for the operator.

The preferred form of engine is a 2-cycle, air cooled engine, having the cylinder placed in a horizontal plane, as shown in Fig. 2. Referring to Fig. 4, the intake is shown at 33 and the exhaust at 34. The piston 35 is provided with a lower flange 36, having in one side an opening 37 protected by a baffle wall 38. The intake 33 communicates with a port 39 so located in the cylinder wall that on the extreme up-stroke the opening 37 will communicate therewith. The exhaust 34 communicates with a port 40, so located in the cylinder wall that on the extreme down-stroke the piston will completely uncover same, as shown in the figure. A passageway 41 in the opposite side of the cylinder wall terminates in ports 42 and 43, the former communicating with the space 44 at the lower end of the cylinder casing and the latter communicating with the upper end of the cylinder. The flange 36 is provided with a port 45 so located that the port 42 may communicate with the space 44 when the port 43 is uncovered by the extreme downward motion of the piston. A baffle wall 46 on the upper end of the piston serves to deflect gases entering through the port 43 and to throw them upwardly toward the upper end of the cylinder.

The frame 47 of the engine may be of cast iron, steel or other suitable material, the cylinder head 48 being removable therefrom. The lower end of the engine frame is provided with an opening 49, preferably closed by means of a screw plug 50. The hole 49 is so placed that when the piston is on its down-stroke the crank-pin 51 will be accessible by removing the plug 50.

The main journal of the engine comprises a casing 52, set into the side of the frame 47 and preferably held by means of studs 53. The casing 52 has formed integral therewith a sleeve 54, extending outwardly over the shaft a distance necessary to give the proper bearing surface, and it is preferably lined with an anti-friction bearing metal 55, such as babbitt or lumen. The engine shaft 56 has secured to it at one end the crank 57 and at the other end the shaft forms a bearing portion 58. Intermediate between the bearings 56 and 58 is a shouldered portion 59, adapted to receive the hub 60 of the driving wheel 61. This hub 60 preferably abuts against the shoulder 62. The piston 35 is provided with a cross-hole 63, through which may be driven a pin 64 for the upper end of the connecting rod 65. This pin may be held firmly in position, as by means of a set screw 66. The crank 57 is preferably secured to the shaft 56 by being driven thereupon and held in place by means of a key 67.

The method of operation of the engine is as follows: When the piston reaches the extreme end of the upper stroke, the opening 37 will register with the port 39, thereby allowing gas to pass from the intake 33 into the space 44 beneath the piston. The baffle wall 38 will throw the gases against the lower portion of the piston, and when the piston starts on its down-stroke the gases will be thereby thoroughly agitated and mixed. As soon as the piston has traveled downward an amount sufficient to close the port 39, the gases in the space 44 will be somewhat compressed. When the piston has nearly completed its down-stroke, the port 40 will first be uncovered and the burned gases will thereupon be exhausted. A small further movement of the piston down will uncover the ports 42 and 43 and thereupon the fresh gases from the space 44 will rush up through the passage 41 into the cylinder, and by striking against the baffle wall 46 they will be thrown into the upper portion of the cylinder in such a way as not to mix to any material extent with the burned gases of the previous stroke. Shortly after the up-stroke commences, all of the ports will again close and compression in the upper part of the cylinder will commence. At the same time the pressure of the gases in the space 44 will be somewhat reduced, or, in other words, a partial vacuum will be created, so that when the opening 37 again registers with the port 39 the fresh gases will rush into the space 44, as hereinbefore described, and the movements of gas will be again repeated.

The cylinder head 48 is preferably provided with a spark plug 68, which may be of any one of the well known types and need not be further described. The cylinder head should further be provided with an opening 69, adapted to receive a second spark plug if desired, but ordinarily closed as by means of a plug 70. A coaster valve 71 may also be provided for use particularly when running on down grade. This coaster valve comprises a valve 72 connected to a stem 73 and normally held in upward or closed position by means of a spring 74. The upper portion of the valve is provided with a block 75, through which a cam pin 76 is passed, said cam pin adapted to force the valve 72 open to any desired extent, according to the position of the pin. The means used for regulating the position of this cam pin will be hereafter pointed out. The object of this coaster valve is to relieve the compression to any desired amount, thus allowing the engine to run freely and without the wear and tear and vibration which would ordinarily accompany the free running of such an engine when coasting, especially on down-grade, and to prevent consumption of power when coasting.

As heretofore stated, the engine is provided on its side with flanges adapted to be supported between the rails 9 and 10 of the frame of the body. As shown in Fig. 4, it is necessary to provide a passageway 41 connecting the lower and upper portions of the cylinder. In my improved motor car construction, I place this passageway on the same side of the cylinder which is occupied by the flanges, thus diminishing its space and increasing the rigidity of construction. This construction is clearly brought out in Fig. 4, where the lower flange is shown at 77. The upper and lower flanges may be firmly bolted to the upper and lower rails, respectively, by bolts passed through the holes 78. In order to fasten the engine still more securely, the casing 52 may be provided with flanges 79 having therein holes 80. These flanges may then be bolted upon upper and lower rails 9 and 10 by bolts passing through these holes.

The crank 57 is provided on its journal side with a flange 81, which forms a circular pocket 82. A hole 83 connects this circular pocket with the bearing 84, whereon the connecting rod 65 bears on the crank pin 51. A cup 85 surrounds the opposite end of the driving shaft and is forced against the end of the journal 54 by means of a spring 86, whose opposite end bears against the hub 60 of the driving wheel. This cup is provided with packing material 87, which effectually prevents oil or other lubricant from working out of the journal at the wheel end. A lubricator 88, Fig. 3, supplies oil to the journal 55, so as to keep it always well lubricated. It is seen that the excess oil will gradually work out from the journal 54 toward the crank end, and that as this oil works out in service it will be thrown by centrifugal force into the pocket 82; thence it will flow, also by centrifugal force, through the passage 83 into the bearing 84, thus effectually and continually lubricating the crank pin and bearing. If desired, a pet-cock 89, Fig. 2, may be provided in the lower portion of the casing 47, so that any excess oil may be withdrawn from time to time.

Referring now to Fig. 5, the preferred type of commutator is shown in section. This comprises a sleeve 90 shrunk onto the shaft 59 or connected to it in any desired manner. The sleeve 90 carries a circular insulating block 91 having set therein a segment of steel or bronze 92, which is in electrical communication with the shaft 59. A frame 93 surrounds the shaft and incloses the insulating block 91 and steel contacting block 92. This frame 93 is provided on one side with a hole 94, through which may be passed a sleeve 95 having on one end a collar 96. This sleeve is threaded and may be clamped onto the frame 93 by means of a nut 97. The sleeve and nut are, however, insulated from the frame 93, as by means of an insulating spool 98. A brush 99 sits within the sleeve 95 and is held normally in contact with the circular insulating block 91, as by means of a spring 100. The brush 99 is provided with a hole 101 and set screw 102, whereby the wire may be securely clamped to the brush 99. Since the sleeve 90 is rigidly attached to the shaft 59 and therefore is held rigidly with respect to the crank 57, it is seen that the contacting block 92 would always maintain a fixed relation with respect to the crank. Therefore by rotating the frame 93 with respect to the fixed parts of the car the time of spark of the engine can be adjusted to suit any requirements. To this end the frame 93 is suitably carried by the fixed parts and means are provided for rotating it with respect to them, and such means will be hereafter described. The frame 93 is provided on one end with a flange 103, which may sit within a recess 104 in the journal box 105. The frame 93 may be split, the two halves being held together by means of screws or bolts in any desirable manner. One side of the frame is provided with a lug 106, to which a suitable rod may be connected for rotating the frame in order to change the time of spark.

The type of out-riding bearing best suited to my improved construction is well shown in Fig. 4, rotated 90 deg. from its normal position, and its construction is as follows: A sleeve 107 surrounds the shaft and is provided on one-half of its interior portion with a recess 108, which may be filled with packing or lubricant 109. The other half of the interior of the frame is preferably lined with suitable bearing material, such as babbitt or lumen 110. The shaft 58 may have threaded into its end a stud 111, which bears against a washer 112 sufficiently large to prevent the shaft 58 from being withdrawn from the bearing. A cap 113 is fitted over the entire end of the shaft and is threaded onto the sleeve 107, thereby securely protecting the end of the shaft from injury and preventing the influx of dust and the loss of oil or other lubricant. The sleeve 107 is preferably provided with grooves 114 and 115, the latter of which may receive buffing material 116, such as leather or hard rubber. These upper and lower grooves are adapted to receive the rails 11 and 12, and the side grooves 114 and 115 are adapted to receive blocks 117 and 118 (118 not shown), which may be held in position by being bolted to the rails 11 and 12.

The direction of motion of the car, as shown in Fig. 2, is toward the head of the cylinder. Therefore, the driving force exerted on the out-riding bearing will be against one side of the anti-friction metal 110, which will therefore serve to provide ample bearing surface to take up the stresses, and, at the same time, cause the least amount of friction. Also the lubricant 109, being on the lower side of the bearing, will serve to amply lubricate the shaft, inasmuch as the lubricant will be carried over against the bearing material.

The journal boxes 18 may be of a construction similar to that described for the out-riding bearing of the driving shaft, or they may be of any suitable or well known construction.

A fuel tank 119 may be provided in any suitable location, but is preferably located between the upper rails 22 and 23 and beneath the platform 21. In this location it is sufficiently high above the cylinder of the engine to feed properly and, at the same time, it may be easily filled through an inlet opening 120. The fuel tank communicates through a connection 121 with a carbureter 122, preferably located immediately above the case of the engine and at one side of the drive wheel 61.

A battery and supply box 123 may be carried between struts 25 and 26 and the rails 9 and 22, and corresponding struts and rails on the opposite side of the body of the car. In this location it will be firmly carried and will be out of the way, and therefore not likely to be injured.

The controlling levers are preferably located above the surface of the platform 21, as best shown in Figs. 1, 2 and 3. The lever 124 connects to a pipe 125, whose lower end carries a crank 126, which in turn connects, through the medium of a link 127, with the moving part of the carbureter 122. A lever 128 connects with a rod 129 passing down through the pipe 125, said rod on its lower end being connected with a crank 130, which in turn operates the cam rod 76 of the coaster valve. A lever 131 is connected to a rod 132 which connects through a link with the lug 106 on the commutator, so that movements of the lever 131 will rotate the frame 93 of the commutator, thereby regulating the time of spark. A valve 133 placed in the fuel supply pipe 121 may be used for completely cutting off the supply of fuel when the car is at rest, or in case of emergency.

A brake-shoe 134 is pivoted at 135 to the rails 22 and 23, and may be manipulated by means of a handle 136 on the end of the lever arm 137. This handle 136 is carried parallel to and a short distance below the platform 21, so that the operator can easily grasp it to apply the brake.

The engine which has heretofore been described is preferably one in which the line of travel of the piston is slightly below the center line of the driving shaft. Such a construction will provide what is known as a quick stroke engine, or, in other words, one in which the driving strokes will be performed at higher speed than the return stroke. Such an engine is well adapted for use on this type of car for the reason that the amount of vibration will thereby be materially reduced, the wear and tear on the moving parts will be largely done away with, and greater security and certainty of operation will be obtained. These features are particularly desirable in a type of car which makes use of direct drive and which operates at high speed.

In order to facilitate operations about the engine when running, a platform 138 may be provided on the engine side of the body of the car. This platform may be carried by a pair of cantaliver arms 139 suitably bolted to the lower rails 10 and 12. It will presently appear that this platform may also be used for another purpose.

The preferred manner of attaching the third and fourth wheels 140 and 141, respectively, will now be described. Two cross rails 142 and 143 are properly connected into a Y-connector 144 at their outer ends, this Y-connector carrying a shaft on which the the third wheel 140 rotates. The Y-connector may be of any suitable type and need not be further described. The rails 142 and 143, near their inner ends, are provided with spacing blocks or angles, such as 145, best shown in Fig. 6. The longer leg of each of these angles is provided with a slot through which may be passed a bolt 146, so that the exact position of the angle on the rail may be regulated after loosening the bolt. The rails are each rigidly attached to the upper longitudinal rails 9 and 11 by means of I-bolts, such as 147 of Fig. 6. These I-bolts are of a size to receive the rail, and it is evident that by drawing them upward the cross rails will be rigidly held against the longitudinal rails. In order to provide a more efficient bearing surface between the longitudinal and cross rails, bearing plates, such as 148, may be set within the longitudinal rails in proper position to engage the cross rails. The nuts 149, which draw the I-bolts, may be of any suitable type, but preferably butterfly nuts, which can be easily tightened with the fingers.

The spacing blocks 145 are properly located on each cross rail so that the same may be inserted through the I-bolts, and the latter may then be tightened without the necessity of measuring the exact location of the third and fourth wheels, it being evident that these will come to gage when the spacing blocks have been properly brought against the rail 9.

The fourth wheel may be attached to the rails 9 and 11 in the manner previously described, but its outer end may be further braced by means of a longitudinal rod 150, provided on each end with an eye, which may be bolted in any suitable manner to the end of the cross rail.

It is evident that the construction herewith described for carrying the third and fourth wheels is an extremely simple one, one which will carry the wheels with great rigidity, one which will enable the wheels to be easily and quickly attached or disconnected, and one which will always insure that the wheels are properly gaged without the necessity of measuring their exact location.

A tray 151 may be laid upon the cross rails 142 and 143 and secured thereto by means of hook bolts 153, best shown in Fig. 8. These hook bolts are of such a shape that when drawn by means of nuts 154 the hooks will embed themselves in the cross rails, thus securely holding the tray from vibration and, at the same time, preventing it from working outwardly along the rails toward the third wheel. It is evident that in case the tray should move out a small amount all four of these hook bolts would become disengaged and thus release the tray; and for this reason it is desirable that the hook bolts should be of a type which will prevent any longitudinal motion.

It is desirable in a motor car of this type to secure as much leverage as possible for the prevention of overturning of the body portion on left-hand curves—that is, curves toward the left hand when looking forward along the body portion. It is seen that by placing the engine and all of the appurtenant heavy parts on the track side of the frame of the body portion the greatest amount of leverage possible will be obtained for holding the third and fourth wheels down against the opposite rail. The placing of the tray 151 on the cross rails 142 and 143 will also increase this leverage and place the dead weight in location where it will be of the greatest use. Furthermore, weight may be thrown on the platform 138 by standing on the same, especially on sharp curves, and thus still further aiding to keep the third and fourth wheels properly on the opposite rail.

Although I have shown the motor car as provided with a fourth wheel, still it is evident that this may be dispensed with when desired, the third wheel alone being used on the opposite rail.

A 2-cycle engine is well adapted for service on motor cars, and particularly when used for direct drive. This is because the driving effort is more uniform in such a car, inasmuch as one working stroke occurs during each revolution of the engine.

The longitudinal rails 9 and 11 are preferably provided on their rear ends with handles 155 and 156, respectively, which are used for easily removing the car from the track. When it is desirable to remove the car, it is only necessary for the operator to jump off of the platform 21, grasp the handles 155 and 156, lift the rear wheel off of the rail, and pull the car sidewise away from the track. The car being of light construction, it is possible for one man to remove it in this way in a very few seconds, thus largely increasing the safety of operation and preventing serious wrecks. It is seen that the heaviest portions of the car are in the rear and adjacent to the handles 155 and 156, so that the heaviest part of the car may be lifted directly off of the rail and the other portions, being comparatively light, may be easily dragged off afterward.

In my improved motor car I am enabled to bring together all of the controlling levers and handles within a comparatively small radius. Because of this, the car is at all times entirely and easily under the control of the operator and confusion is avoided, especially at times requiring the quickest action. In case it were desired to make an extremely sudden stop, the left hand would be used to manipulate the levers 124 and 128 and the right hand would at the same time be used to set the brake by pulling upwardly on the handle 136.

Inasmuch as the third wheel is located considerably forward of the rear driving wheel, and, in fact, almost on a line with the forward wheel of the body portion of the car, it is evident that any twisting force due to applying forces on the rear or driving wheel will be overcome in the best possible manner. By the addition of the fourth wheel, the safety of operating at high speed will be improved, but for ordinary purposes this wheel is not necessary.

The electric circuit for the spark may include a contact 157 adapted to open said circuit when the coaster valve is open, thereby cutting off the spark by the same operation as that which opens the coaster valve.

I claim:

1. In a motor car, a body portion, the framework of the body portion comprising a plurality of longitudinal rails, cross braces and struts, four of said rails being spaced apart vertically a distance to receive the journal boxes of the axles of the main wheels, supporting flanges of the engine and cross rails of a third and a fourth wheels, and said rails being spaced apart horizontally a distance to receive the main wheels and the cross braces, substantially as described.

2. In a motor car, a body portion comprising a framework, a platform on the framework, wheels and mechanism for driving the car, the driving mechanism comprising an internal combustion engine, the cylinder of the engine being in horizontal position and the engine being provided with supporting flanges, and the framework comprising longitudinal rails, cross braces and struts, four of the longitudinal rails being spaced apart vertically a distance to receive the journal boxes of the axles of the main wheels and the supporting flanges on the side of the engine, and cross rails for third and fourth wheels, and being spaced apart horizontally a distance to receive the main wheels, the struts being on the aforesaid longitudinal rails, other longitudinal rails being supported on the struts, and the platform being suitably attached to the last mentioned rails, substantially as described.

3. In a motor car, a body portion and an internal combustion engine for driving the car, the framework of the body portion comprising a plurality of longitudinal rails, cross braces and struts, the engine being provided with a side passageway from its lower portion to its upper portion and being provided with supporting flanges adapted to inclose said passageway, four of said longitudinal rails being spaced apart vertically a distance to receive the supporting flanges of the engine, journal boxes of the main axles and cross rails of a third wheel and being spaced horizontally a distance to receive the main wheels and to support the cross braces, substantially as described.

4. In a motor car, a body portion and third and fourth wheels, the body portion comprising a framework, a platform on the framework, wheels and mechanism for driving the car, the framework comprising longitudinal rails, cross braces and struts, four of the longitudinal rails being spaced apart vertically a distance to receive the journal boxes of the main wheels and cross rails for the third and fourth wheels and being spaced apart horizontally a distance to receive the main wheels and to support the cross rails, U-bolts in the longitudinal rails adapted to receive the cross rails, each cross rail adapted to engage a U-bolt in each of two longitudinal rails, substantially as described.

5. In a motor car, a body portion and third and fourth wheels, the body portion comprising a framework and a platform on the framework, the framework comprising a plurality of longitudinal rails, cross braces and struts and cross rails for the third and fourth wheels, the longitudinal rails being spaced apart vertically a distance to receive said cross rails and being spaced apart horizontally a distance to support the same, the cross rails for the third wheel being placed at an angle with each other and suitably connected to the longitudinal rails, substantially as described.

6. In a motor car, a body portion and third and fourth wheels, the body portion comprising a framework and a platform on the framework, the framework comprising a plurality of longitudinal rails, cross braces and struts and two cross rails for the third wheel and one cross rail for the fourth wheel, each cross rail being suitably secured to two longitudinal rails, and a brace from the cross rails of the third wheel to the cross rail of the fourth wheel, substantially as described.

WARRINGTON E. ADAMS.

Witnesses:
THOMAS A. BANNING, Jr.,
FRANCES M. FROST.